July 12, 1927.
S. HOROWITZ
1,635,673
DISPLAY DEVICE FOR SLIPPERS
Filed March 8, 1927
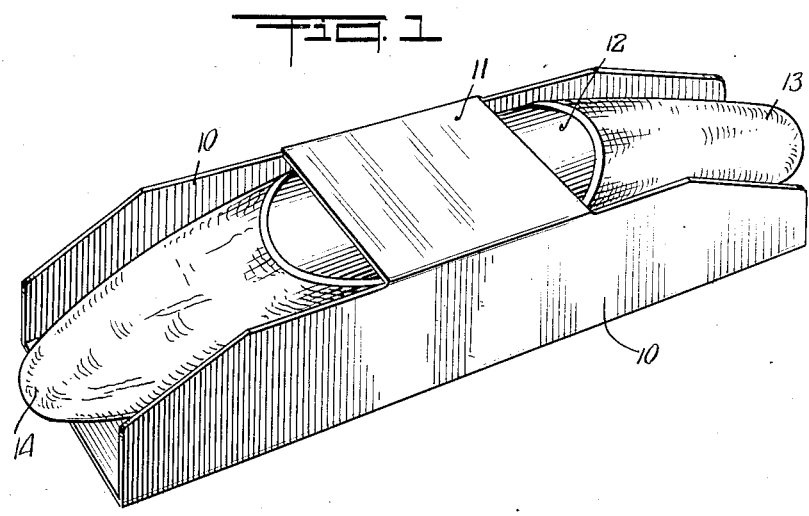
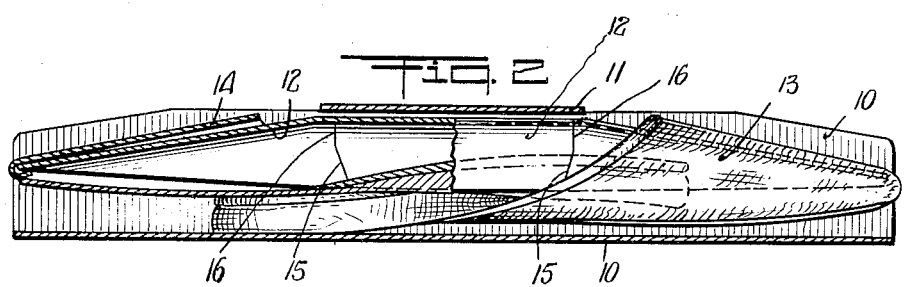
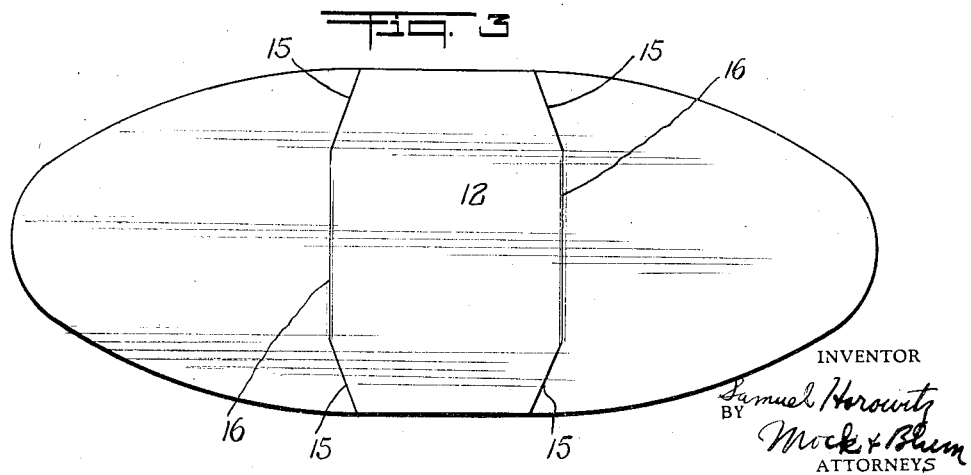
INVENTOR
Samuel Horowitz
BY
Mock & Blum
ATTORNEYS

UNITED STATES PATENT OFFICE.

SAMUEL HOROWITZ, OF NEW YORK, N. Y.

DISPLAY DEVICE FOR SLIPPERS.

Application filed March 8, 1927. Serial No. 173,647.

My invention relates to a new and improved combined display and retaining device for displaying slippers or the like.

One of the objects of my invention is to provide a device which will be very simple and which can be manufactured at a minimum cost.

Another object of my invention is to provide a device whereby the slippers can be connected independently of the display container therefor so that packing the slippers in the display container is facilitated.

Other objects of my invention will be set forth in the following description and drawing which illustrate a preferred embodiment thereof, it being understood that the above general statement of the objects of my invention is intended merely to generally explain the same and not to limit it in any manner.

Fig. 1 is a perspective view showing the slippers packed in the display container.

Fig. 2 is a central sectional view of the device shown in Fig. 1.

Fig. 3 is a top view of the combination slipper tree.

As shown in Figs. 2 and 3, the slippers can be securely connected to each other independently of the display container 10 by means of a double-ended tree 12 which is made of paper or other light, flexible material. The tree 12 is scored along the lines 16 and it is cut along the lines 15 so that it can be bent into arch-like form, as shown in Fig. 2. The arch of the shoe tree may be termed a transverse arch since the elements thereof are at right angles to the axis of the tree.

The display container 10 is open at the ends thereof and it is also open at the top thereof save for the top cross-piece 11. The slippers 13 and 14 are placed with their heelless ends overlapping each other, as shown in Fig. 2, with the tree 12 properly inserted. The ends of the tree 12 fit with sufficient frictional force within the slippers so as to connect them securely. When the tree 12 is grasped, the two slippers can be manipulated as a unit, as their weight is not sufficient to dislodge them from the ends of the tree 12.

When the parts are assembled, the frictional fit between the tree 12 and the top piece 11, and between the ends of the tree 12 and the slippers 13 and 14, is sufficient to retain the parts in the assembled position shown in Fig. 1, irrespective of the position of the device. For example, if desired, the container 10 can be held vertically and shaken with considerable force without dislodging the slippers.

It is obvious that the device is very simple and convenient and can be made with minimum expense.

I have found that it is important, for the purposes of my invention, that the shoe tree 12 should be independent of the box because it can then be transversely arched throughout, and particularly at the central portion, so that even though the shoe tree is made of thin, flexible material, such as heavy paper, it has sufficient rigidity to secure the necessary tight frictional fit with the slippers and with the top member 11 of the box.

I have shown a preferred embodiment of my invention, but it is clear that numerous changes and omissions could be made without departing from its spirit.

I claim:—

A display packing for a pair of slippers or the like comprising a box open at the ends thereof and having a top portion, said box having a pair of slippers therein and having their toe portions outwardly directed, the said slippers being connected by a double-ended and transversely arched shoe tree made of thin flexible material which fits frictionally within the slippers and also bears frictionally against the top portion of the box.

In testimony whereof I affix my signature.

SAMUEL HOROWITZ.